United States Patent
Virtanen (10) Patent No.: US 6,837,014 B2
(45) Date of Patent: Jan. 4, 2005

(54) PARQUET UNDERLAY MATERIAL

(75) Inventor: Thomas Virtanen, Espoo (FI)

(73) Assignee: Vircon Oy, Espoo (FI)

( * ) Notice: Subject to any disclaimer, the term of this patent is extended or adjusted under 35 U.S.C. 154(b) by 13 days.

(21) Appl. No.: 09/994,851

(22) Filed: Nov. 28, 2001

(65) Prior Publication Data

US 2002/0073640 A1 Jun. 20, 2002

(30) Foreign Application Priority Data

Nov. 28, 2000 (FI) .............................................. 20002605

(51) Int. Cl.$^7$ .............................................. E04B 1/82
(52) U.S. Cl. ........................ 52/390; 52/403.1; 52/408; 52/413; 52/309.8
(58) Field of Search ................................ 52/403.1, 408, 52/411, 413, 390, 391, 309.4, 309.8, 309.13; 428/98, 105, 147, 163, 304.4

(56) References Cited

U.S. PATENT DOCUMENTS

| | | | |
|---|---|---|---|
| 4,694,627 A | | 9/1987 | Omholt |
| 5,826,390 A | * | 10/1998 | Sacks ........................ 52/408 |
| 5,924,252 A | * | 7/1999 | Deike ........................ 52/390 |
| 6,378,259 B1 | * | 4/2002 | Carlson ........................ 52/408 |

FOREIGN PATENT DOCUMENTS

| | | |
|---|---|---|
| DE | 2 123 025 | 11/1972 |
| DE | G 91 15 773.0 | 4/1992 |
| FI | 29 753 | 3/1958 |
| FI | 29 859 | 5/1958 |
| FI | 50561 | 8/1971 |
| FI | 86996 | 3/1991 |
| FI | 956192 | 12/1995 |
| FR | 2 731 737 | 9/1996 |
| GB | 1 514 516 | 6/1978 |
| SE | 383 646 | 3/1976 |
| WO | 95/00730 | 1/1995 |

* cited by examiner

Primary Examiner—Carl D. Friedman
Assistant Examiner—Basil Katcheves
(74) Attorney, Agent, or Firm—Young & Thompson (57) ABSTRACT

A prefabricated underlay material (1) for location between upper surface of a load-bearing floor (8) and a continuous surface material (9), which underlay material comprises a substantially flexible sheet material (2) and dampening projections (3) formed of porous resilient material on one surface of the sheet material and distributed along the surface. Dampening projections (3) comprise strips (13) of foamed polymer or polymer mixture bonded to a first surface (11) of the sheet material without deformation of the surface thereof, which strips are located continuous, or intermittently continuous, with intervals (S) and are either principally straight or substantially undulating.

26 Claims, 4 Drawing Sheets

PARQUET UNDERLAY MATERIAL

BACKGROUND OF THE INVENTION

The invention relates to a prefabricated underlay material for location between the upper surface of a load-bearing floor and a parquet or other continuous surface material, which underlay material comprises a substantially flexible sheet material and dampening projections formed of porous resilient material on at least one surface of the sheet material, distributed along said surface of the sheet material and having a total projection area less than the area of the sheet material. The invention also relates to a method for the manufacture of an underlay material for location under parquet or other continuous surface material, in which method dampening projections formed of porous resilient material are arranged located at intervals on at least one surface of an substantially flexible sheet material, the total projection area of said dampening projections being less than the area of the sheet material.

The principal function of the underlay material is to act as an installation base for parquet, floorboards, laminated wood panels, plywood or other relatively hard surface material between the surface material and the load-bearing floor material. The load-bearing floor has an upper surface corresponding at least to the installation area of the parquet or equivalent surface material and the underlay is located on this upper surface in connection with the installation work before putting the parquet or equivalent surface material in place. The material of the load-bearing floor is typically concrete, although other materials sometimes occur too, and the underlay material should then even out minor irregularities in the upper surface of the concrete. In addition the underlay material should act as acoustic insulation and dampen noise, which is created inter alia when walking on a relatively hard surface. Besides this the underlay material should act as a ventilating layer under the parquet and enable the escape of possible moisture from the load-bearing floor material, such as from a concrete slab. This is especially important in new building, because due to tight building timetables drying out of the structures has generally remained partially deficient. Further, moisture must not be allowed to migrate from the load-bearing floor material, such as a concrete slab, to the surface material, such as parquet, because then there would be a risk of damp damage to the parquet, causing inter alia deformation of the parquet.

One prior known solution for use as an underlay material for parquet is a uniform layer of porous polyethylene approx. 1–3 mm thick. The solution provides good acoustic insulation, a good installation base for the parquet and the underlay is easy to install, but the surface of the load-bearing concrete slab is then covered by an airtight layer, which prevents the escape of moisture from the slab. The solution based on balls of expanded polystyrene located between polyethylene films likewise provides poor escape of moisture. Such a solution is described in utility model DE-G 91 15 773, although there an attempt has been made to alleviate the problem by making one of the polyethylene films perforated. Earlier corrugated cardboard was commonly used as an underlay material, but in time becomes crushed and loses its elasticity. Further, moisture can migrate directly to the parquet through the layer of corrugated cardboard and damp corrugated cardboard promotes the growth of mould, which is a health risk for users of the accommodation. Further known for use as an underlay material is cardboard, on the surface of which are pieces of cork attached by bituminous adhesive, or according to Patent Application FI-956192 felt, to which are attached with the aid of a bituminous layer impact noise dampening plastic beads, which are embedded in the bituminous layer. Both these underlay materials, however, easily dirty the accommodation during the installation phase. If the black bitumen layer contacts a light-coloured wall it leaves marks, which are difficult to remove. Further, pieces of cork become completely or partially detached from the bituminous adhesive, forming debris.

An attempt to solve these problems has been made in the underlay material described in patent publication FI-86996, which consists of a supporting band of paper or cardboard on one side of which pre-expanded polymer granules are fixed with the aid of a polymer coating. This underlay material is manufactured by pressing a web of paper or cardboard and molten plastics extruded from a nozzle together in the nip between a press roll and a cooling roll at the same time as pre-expanded, i.e. porous, plastic granules are introduced into said pressure nip by feeding them onto the top of the chill roll. The porous plastic granules are thus carried on the surface of the chill roll into the nip between the rolls, where they are pressed into the still molten polymer coating layer, as can be seen from the figures in the publication. In the publication LD polyethylene is used as the coating polymer and pre-expanded polystyrene granules are used as the porous plastic granules. In the compression test reported the deformation was 33% at a load of 2.0 kp/cm$^2$ (=196 kPa) and compression time of 10 minutes, which seems a high value. As an end product the underlay material according to the publication would in principal function in the intended fashion, but the manufacturing technique is very problematic, so that useable underlay material is not obtained on the necessary production scale. The product described in the publication is thus merely theoretical, and not applicable in practice. It has not been brought to the market at all.

The solutions used earlier have each been individually useable to some extent in respect of some certain property, but none of the known underlay materials has succeeded in combining all the required good properties and eliminating all the drawbacks at the same time as being possible to manufacture efficiently and economically. The invention aims to combine in the same solution all the good properties of an underlay material and to eliminate the drawbacks present in earlier solutions. In this connection it should also be noted that the properties of a good underlay material include a certain yielding under load with return to its former state upon removal of the load, so the manufacturing technique for the underlay material should be such that a material satisfying the requirements can be used as the resilient material. The finished underlay material should also be easy to handle and install, non-messy and durable. Further, an aim of the invention is such underlay material which would be easily manufactured also in large quantities and with very small material waste and for which the production apparatus would be simple and not require large investments. For the components of the underlay material it should be possible to use economically advantageous materials. All in all, the underlay material should be got competitive in price compared to known underlay materials. If necessary it should be possible to incorporate a moisture barrier in the underlay material or to omit it.

SUMMARY OF THE INVENTION

The problems described above are solved and the objectives defined above are realized by the underlay material and the manufacturing method according to the invention. According to the first aspect of the invention a prefabricated underlay material features that the first surface of the first sheet material extends continuously and flat beneath the dampening projections and in the area between them; and said dampening projections formed of porous resilient material: are made of a foamed polymer or polymer mixture bonded to said flat first surface by effect of its/their material properties at the time for manufacture; and are principally straight continuous or intermittently continuous strips located with intervals, or substantially undulating continuous or intermittently continuous strips located with intervals. According to the second aspect of the invention a prefabricated underlay material features that the first surface of the first sheet material extends continuously beneath the dampening projections; and said dampening projections formed of porous resilient material: are a foamed polymer or polymer mixture bonded to said first surface without glue through preliminary melt adhering; and are continuous or intermittently continuous strips located with intervals. According to the third aspect of the invention a method for manufacture of the underlay material comprising the steps: providing a prefabricated polymer film, or a laminate furnished with a polymer film, or a paper or a cardboard as a first sheet material; said first sheet material is moved with its first surface exposed; a foamed or foaming polymer in molten state is extruded onto said first surface at extrusion points having intervals therebetween, said intervals being perpendicular to a direction of said motion of the first sheet material; the foamed or foaming molten polymer is allowed to bond fast to the first surface of said sheet material; the foamed polymer is allowed to set to a solid state thereby forming said dampening projections. Advantages of the invention are effective ventilation between the parquet or other continuous surface material at the same time as the parquet or equivalent surface material is protected by means of the underlay material from possible moisture in the load-bearing floor, as well as the possibility of using for the dampening projections a plastic suitable for the purpose in respect of its mechanical properties and also other properties. Also an advantage is the possibility of making the underlay material with the desired properties of use, such as stiffness and thickness, within wide limits without adversely affecting the aforementioned properties. By choosing a suitable polymer for foaming, the dampening projections can easily be made non-absorbent of moisture and resistant to moisture. Additionally, an advantage of the underlay according to the invention is effective acoustic insulation, which can be maintained even when exploiting the possibilities for variation described above. Further, the manufacture of underlay material according to the invention can be implemented competitively and in the required quantity without special problems.

BRIEF DESCRIPTION OF THE DRAWINGS

In the following the invention is described in more detail with the aid of examples and referring to the following drawings.

DESCRIPTION OF THE PREFERRED EMBODIMENTS

Figure 6:
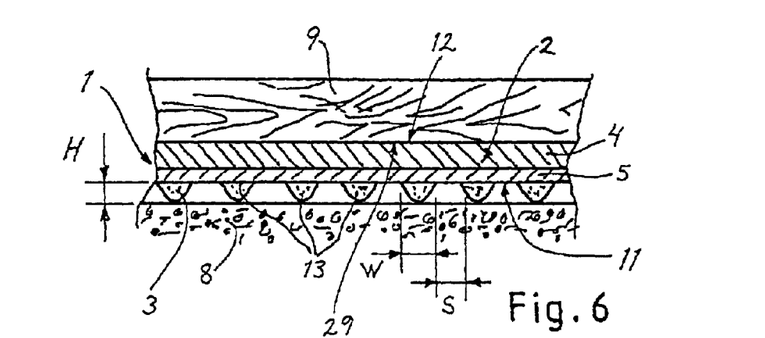
Figure 7:
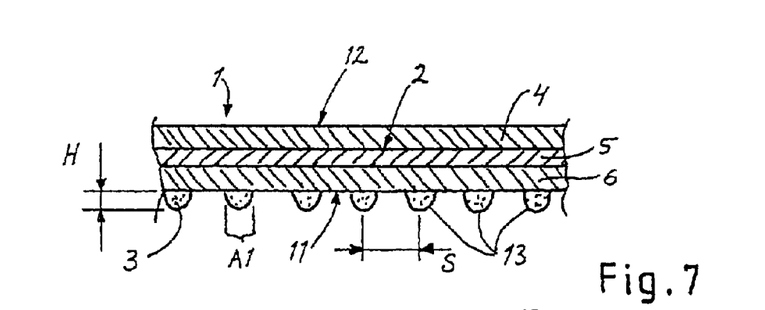
Figure 8:
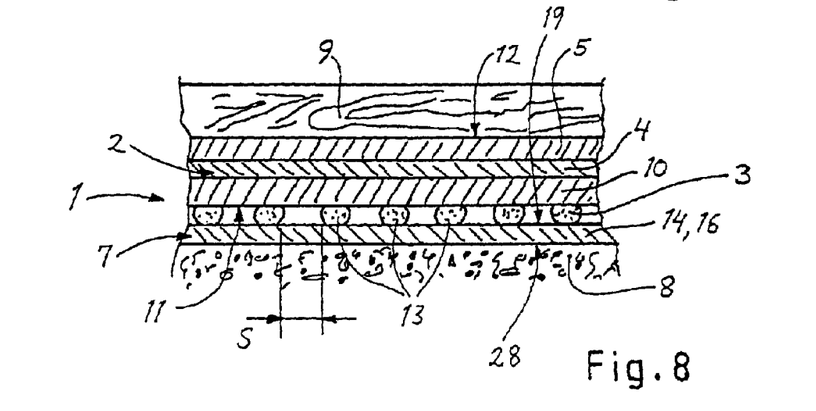

FIGS. 1–4 show a prefabricated underlay material 1 including an substantially flexible sheet material 2 comprising one or more layers and on the surface of which flexible sheet material a porous and resilient material is spread in strips 13 so that it covers only part of the surface area A2 of said sheet material forming dampening projections 3. By substantial flexibility of the sheet material is meant here that the sheet material can be rolled up and unrolled easily by hand. Similarly the prefabricated underlay material 1 is substantially flexible, i.e. the underlay material too can be rolled up and unrolled by hand. The underlay material 1 is prefabricated in a factory or equivalent production facility and transported ready for installation, i.e. prefabricated, to the installation site of the parquet where it is spread out over the surface of the load-bearing floor. The sheet material 2 is so thin and of such a type of material and additionally the dampening projections 3 bonded to said sheet material are so dimensioned and of such material that the ready-to-install underlay material can if necessary be cut to size at the installation site, for example, by scizzors or a knife. In use this underlay material 1 is located between upper surface 18 of a load-bearing floor 8 and parquet or other continuous surface material 9, as can be seen in FIGS. 6 and 8. In practice the underlay material 1 is spread out over the surface 18 of a load-bearing floor, such as a concrete floor or other at least mainly connected load-bearing floor surface, and after this the parquet or other relatively hard, at least in respect of its upper surface, surface material 9 is installed on top of the underlay material, so that a load which is applied to the floor is transferred via the underlay material to the load-bearing floor 8. An underlay material such as this is thus used under a floor surface material 9 which alone, i.e. without the support of an uninterrupted continuous load-bearing floor 8, is not capable of bearing the loads to which the surface material or floor in general is subjected during use. The primary purpose of the underlay material is thus to even out minor irregularities in load-bearing floor 8, so that for example the parquet does not flex when walked upon, and to dampen the sounds of footsteps which arise when walking on parquet or other relatively hard surface material 9 or moving other goods, such as furniture. It is evident that the underlay material 1 according to the invention can also be used between the load-bearing floor and a softer and more flexible surface material, which does not so distinctly cause footstep sounds. In this case the advantages are associated more with ventilation and the function as a moisture barrier between the surface material 9 and the load-bearing floor 8, than with insulation of footstep sounds. It is to be understood that there may be minor gaps or cracks in the load-bearing floor 8 provided that these are substantially narrower than the width W of the dampening projections of the underlay material.

The underlay material 1 comprises typically a sheet material 2 forming or including a moisture barrier and dampening projections 3 formed of a porous and resilient material on at least one surface of said sheet material, distributed, generally in a mainly uniform distribution, along the surface of the sheet material and having a total projection area ΣA1, i.e. projections on the surface of the sheet material, which is less than the area A2 of the sheet material. According to the invention the total projection area ΣA1 of the dampening projections is 5%–40%, advantageously in the range 10%–25%, %, of the total area A2 of the sheet material. It is appropriate to choose the total projection area ΣA1 so that the loading of the dampening material in the end use remains at least mainly in the elastic region. Underlay material 1 may also be produced without a moisture barrier. Further, according to the invention dampening projections 3 formed of a porous and resilient material, comprising a foamed polymer or polymer mixture bonded to an substantially flat first surface 11 of at least one i.e. a first sheet material 2 without changing the original form of said first surface 11. More precisely, the first surface 11 of flexible sheet material 2 extends continuously and flat beneath dampening projections 3, as seen from the underside of the underlay material 1 or from the side of the dampening projections resting against the floor 8 in the installed state thereof, and in the area between them A*, i.e. the dampening projections are not at least to any mentionable or readily observable extent sunk into the sheet material, instead the first surface 11 of sheet material 2 at least substantially retains the same surface shape which it had originally before bonding of the dampening projections to it. It is of course possible, depending on the type of the first sheet material, that very small depressions are created in said first surface 11 at the sites of the dampening projections, but in any case said depressions are considerably shallower, measured relative to the level of the interval areas A*, than the thickness H of the dampening projections. Advantageously the depth of these possible depressions, which are not shown in the figures because of their atypical nature, is at most 10% or at most 2% of the thickness H of the dampening projections and in the best case their depth approaches zero. Said dampening projections 3 are principally straight continuous or intermittently continuous strips 13 located with intervals S, of which dampening projections of the first-mentioned type can be seen in FIG. 1 and dampening projections of the latter type can be seen in FIGS. 3 and 4. Dampening projections 3 are alternatively substantially undulating continuous or intermittently continuous strips 13 located with intervals S, of which dampening projections of the first-mentioned type can be seen in FIG. 2 and dampening projections of the latter type can be seen in FIG. 9. In FIGS. 1–4 and 9 only some advantageous application forms of the distribution of the porous, elastic material, i.e. of dampening projections 3, are represented. In practice the porous, elastic-dampening projections 3 can form an unlimited number of different patterns on the surface of the sheet material depending only on the location and movement of the extrusion nozzles 24 described below as well as on the timing of extrusions relative to each other. What is essential, however, is that the porous and elastic strips 13 forming dampening projections 3 have mutual intervals of at least S and possibly in at least part of strips 13 the gap length ΔL of their internal gaps, so that moisture which may rise from the load-bearing floor can escape between dampening projections 3 to the edge of the floor and thence into the air of the room or elsewhere. The interval areas A* between the dampening projections 3 thus form separate air gaps or air spaces independent of the internal porosity of said dampening projections. In practical applications the width W of dampening projections 3, i.e. of porous and elastic strips 13, in the direction of first surface 11 of the sheet material and their thickness H in a direction perpendicular to said first surface 11 is in the range 1 mm–10 mm, so that in a strip the width and height may be considerably different or alternatively approximately equal. The interval S of strips 13 forming dampening projections 3 is at least of the same order of magnitude as said width W, i.e. 1 mm–10 mm or more and is preferably substantially at least equal to said width. The length L of the dampening projections in the direction of strips 13 is at least 2 mm. When the strips are intermittently continuous the magnitude of the gap lengths ΔL of their internal gaps is typically also 1 mm–10 mm.

According to the invention the porous, resilient and foamed polymer which forms dampening projections 3, i.e. strips 13, is polyethylene, atactic polypropylene, some other polyolefin, polyether, ethyl vinyl acetate copolymer, polyamide, polyurethane, silicon rubber, flexible polyvinyl chloride, some biopolymer or mixture of these or some other equivalent plastics. Advantageously the foamed polymer forming dampening projections 3 is chosen from among the mentioned plastics and mixtures of plastics so as to have a creep deformation of less than 10% when a load of 500 kPa is applied for 24 hours or less than 5% when a load of 1 MPa is applied for 24 hours. Thus there are available several polymers or plastics for which the permanent deformation or creep remains very low under longer term loading and which thus have good recovery. There are also useable polymers for which the creep deformation is less than 2% under a load of 5 MPa. When materials such as these are used even under a heavy weight such as an upright piano or grand piano etc. the underlay material 1 will not suffer a permanent deformation sufficient to cause sagging of the surface material or hinder the escape of moisture. The polymers and combinations thereof such as are described above are in the conditions of use, i.e. application environment, of the present invention mainly resilient or elastic and are not at all or only to a relatively minor extent viscoelastic.

The modulus of elasticity in the unfoamed state of the polymer forming dampening projections 3 is in the range 0.002–4 GPa, or over 0.5 GPa or below 3 GPa and porosity is in the range 30–80% by volume or advantageously in the range 40–70% by volume. The foaming of molten polymer (3*) is done most advantageously by air Gi or nitrogen gas $N_2$, because they are advantageous in price and do not cause environmental problems. It is of course possible to use some other gas or mixture of gases Gg, Gas Gi, $N_2$, or Gg is fed, for example in tank 21 through channel or channels 22, into the molten polymer to be foamed 3* while simultaneously mixing molten polymer 3* by a suitable mixing device 20, which occurs prior to extrusion of the molten polymer onto first surface 11 of prefabricated sheet material 2. Alternatively foaming of molten polymer 3* may be performed by a foaming chemical or combination of chemicals, such as water $H_2O$ or carboxylic acid R—COOH, which is mixed with the molten polymer to be foamed prior to extrusion. The most typical materials foamed in this way are polyethers or isocyanate, which can be in the polymer to be foamed already initially or as an additive. Also other materials which behave in a similar way can be employed. In other words, foaming can occur either in tank 21 prior to extrusion or only after extrusion onto the first surface of sheet material 2. The pores of the foamed polymer are preferably closed, i.e. the pore spaces at least mainly have closed walls, so that in dampening projections 3 water cannot advance by capillary action and thus the dampening projections do not get wet. Waxes, oils, terpene resins, derivatives of natural resins, phenyl resins, coumarone resins or some combination of these can be used as an additive in the foamed polymer forming dampening projections 3. Typically so-called melt glues, which are intended to adhere in glue fashion to base or bases when in a molten state, can be used as the polymer or polymer mixture to be foamed. In principle any melt glue whatsoever may be employed, provided that the melting point or melting range is suitable. According to the invention such melt glue is foamed any of the previously described ways. The cross-sectional shape of strips 13 produced in this way may be a semicircle, flattened semicircle, segment of a circle, flattened segment of a circle, approximate circle or flattened circle or any intermediate shape, shape, depending on the viscosity at the production stage, i.e. when extruded molten, of the foamed polymer forming dampening projections 3.

The first sheet material 2, on the first surface 11 of which strips 13 forming dampening projections 3 are extruded, may firstly be a simple prefabricated impervious polymer membrane 5, in which case it is a moisture barrier in itself. As a second alternative the first sheet material 2 may be a prefabricated paper or cardboard 4, in which case there is no moisture barrier, nevertheless this solution too has applications. Sheet materials according to these two alternatives can be seen in FIG. 5, in the first case the material is a polymer membrane 5 and in the second case paper or cardboard 4. As a third alternative the first sheet material 2 may comprise a prefabricated flexible laminate, composing from a prefabricated impervious polymer membrane 5, forming a moisture barrier, and one or more layers of paper and/or cardboard 4; 6 and/or an additional polymer membrane 10. In this case the polymer membrane 5 or 10 forming a moisture barrier is either on the surface of the laminate or an internal layer of the laminate. The sheet material of FIG. 6 has two layers: an upper layer, the outer surface of which, i.e. second surface 12 of the sheet material, comes against lower surface 29 of the surface material 9 such as parquet, which layer is advantageously cardboard or paper 4, and a lower layer, to the lower surface of which, i.e. first surface 11 of the sheet material, dampening projections 3 are bonded, which layer is advantageously a polymer membrane 5. The constructions of sheet material 2 described above are preferred for the reason that they do not include moisture absorbent layers on that side of the moisture barrier, which faces towards load-bearing floor 8. The flexible sheet material of FIG. 7 has three layers, of which the outer layers may be cardboard or paper and the middle layer is a polymer membrane 5, which acts as a moisture barrier. In this case the dampening projections 3 are bonded to surface 11 of the lower cardboard of paper layer 6. FIG. 8 shows a construction of the first sheet material, which in principle is similar to that of FIG. 7, i.e. a laminate, but in this case the laminate comprises pre-arranged polymer membranes 5 and 10 on both sides of cardboard or paper 4. Additionally in this construction there is an substantially flexible second sheet material 7 to which the porous polymer forming dampening projections 3 are also bonded and which is located on the opposite side of said dampening projections in relation to sheet material 2, the strips 13 are thus between first sheet material 2 and second sheet material 7. More exactly, the dampening projections 3 and thus bonded to the third surface 19 of second sheet material 7, which third surface 19 is opposite the first surface 11 of the first sheet material and at a spacing thickness H from it. The said spacing thickness H, i.e. distance between the first surface 11 and the third surface 19, is equal to the thickness H of the dampening projections. This flexible second sheet material 7 is a moisture permeable material, such as paper or cardboard 14 or a plastics film containing open pores or perforated plastics film 16, and when installed is located next to load-bearing floor 8. Each of the layers of sheet material, the cross sections of which are represented in FIGS. 4–8, may itself be of laminate construction, i.e. composing from a plurality of different layers which separately and together are substantially flexible, as described previously. This solution may be necessary if, for example, it is desired to increase the thickness of the underlay material or to form the moisture barrier of several layers of water impermeable material. It is to be especially noted that first surface 11 of the sheet material 2 is glueless, and likewise third surface 19 of the sheet material 7 is glueless. The dampening projections 3 according to the invention are bonded or attached to said first and third surfaces 11 and 19 of the sheet materials by an effect of the material properties of said dampening projections at the time of manufacture, as is explained in the following. The laminates described above may be manufactured by any known or novel method, and so will not be explained here.

Figure 5:
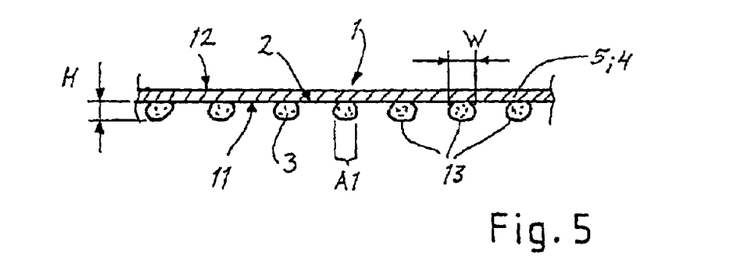
FIGS. 5–8 represent implementation forms of the underlay construction according to the invention, in which the sheet material has one or more layers on the surface of which or between which are variously shaped strips of porous resilient material which form a set of dampening projections. In the figures the underlay material is seen in cross-section along plane II—II of FIG. 1.

The polymer membrane 5 or 10, which creates a moisture barrier, is polyethylene, some other polyolefin, a polyester such as polyethylene terephthalate, polypropylene or other polymer forming an impervious membrane or surface coating. Advantageously the melting point or melting range of the polymer forming the impervious polymer membrane 5, 10 which acts as a moisture barrier is equally high or higher than the melting point of the porous and resilient polymer forming the dampening projections 3, in which case the moisture barrier can if necessary be made very thin without a risk of it being ruptured by melting when the strips 13 forming dampening projections 3 are extruded onto the surface of the sheet material as a molten polymer 3\* in the manner described below. The thickness of polymer membrane 5, 10 may vary within wide limits depending on the construction of the sheet material and the type of polymer. When the sheet material of FIG. 5 is a polymer the thickness of membrane 5 can be in the range 0.005–0.1 mm and advantageously in the range 0.01–0.05 mm. In first sheet material 2 the basis weights of the one or more layers of paper or cardboard in total are typically in the range 100–300 g/m$^2$, although if necessary cardboards or combinations can be used for which the basis weights are in total even greater than the maximum value mentioned, such as $\leq$500 g/m$^2$ or $\geq$500 g/m$^2$. Also lower basis weights, such as <100 g/m$^2$, can be used especially in laminates.

The dimensional relations shown in the figures in respect of material thicknesses, widths and surface areas etc. do not necessary correspond to reality, but illustrate more clearly the construction of the underlay material.

The underlay material for location under a parquet or other continuous surface material 9 is manufactured by arranging dampening projections 3 formed of a porous and resilient material located in a distributed fashion on at least one surface of a sheet material 2, the total projection area $\Sigma A1$ of said dampening projections being less than the area $A2$ of said sheet material. In the method according to invention as the first sheet material 2 is used a prefabricated polymer membrane 5, or a laminated furnished with a polymer membrane, or paper or cardboard 4, in other words a sheet material is used which is finished per se and which can be procured for example in rolls of the desired width. By sheet material is thus meant a material which is relatively thin, thickness generally under 2 mm or under 1 mm, and flexible and fairly wide, width generally 1 m–3 m or more, and long, typically at least 5 m long and in roll form. This first sheet material 2 is moved in a certain direction D, i.e. typically in the longitudinal direction of the material, at a velocity V with its first surface 11 exposed. During this movement foamed or foaming polymer 3* in a molten state is extruded from nozzles 24 into contact with said first surface 11 at extrusion points 15 at intervals S from each other, whereupon the foamed or foaming polymer 3* adheres or bonds fast in strips 13 to the first surface 11 of the first sheet material. Thus the foamed/foaming polymer 3* and dampening projections 3 formed thereof after setting are bonded by effect of their material properties at the time of manufacture to the sheet material 2 or sheet materials 2, 7. The foamed polymer or polymer mixture 3* for the dampening projections is sticky or has melt adhering properties when substantially in molten state, whereupon it bonds to the first sheet material 2, and to the second sheet material 7 if applied, and non-sticky and non-adhering properties in temperatures below its melting point or melting range. Accordingly no separate glues are used. The intervals S are perpendicular to the direction D of motion of sheet material 2. For this nozzles 24 are located at intervals S and are connected by a tube or hose 23 to a tank 21 of the molten foamed or foaming polymer 3*, from which tank molten polymer is fed by pump or pressure or other means to said nozzles. In tank 21 the polymer is melted and mixed if necessary with additives to produce foaming, as described previously. First surface 11 is kept exposed for such a length that the foamed polymer which forms strips 13 and which has been extruded onto said first surface in a molten state has time to set to a solid state, whereon it forms dampening projections 3. The principle can be seen from FIG. 9. After the extruded and foamed molten polymer has set, the underlay material 1, which is formed by the sheet material and the dampening projections bonded to the surface thereof, can be for example rolled or cut into sheets in a manner not shown in the figures.

Figure 1:
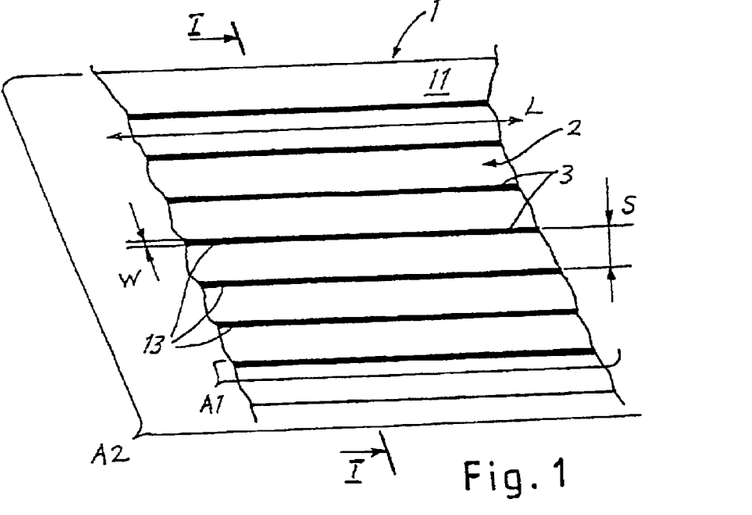
FIGS. 1–4 represent schematically various embodiments of the underlay according to the invention, in which on the surface of the sheet material there are strips of porous elastic material of various forms, so that the strips forming the dampening projections cover only part of the surface area of the sheet material. In the figures the underlay is shown as seen axonometrically from the side on which the dampening projections are located and approximately in direction I of FIGS. 4–8.
Figure 2:
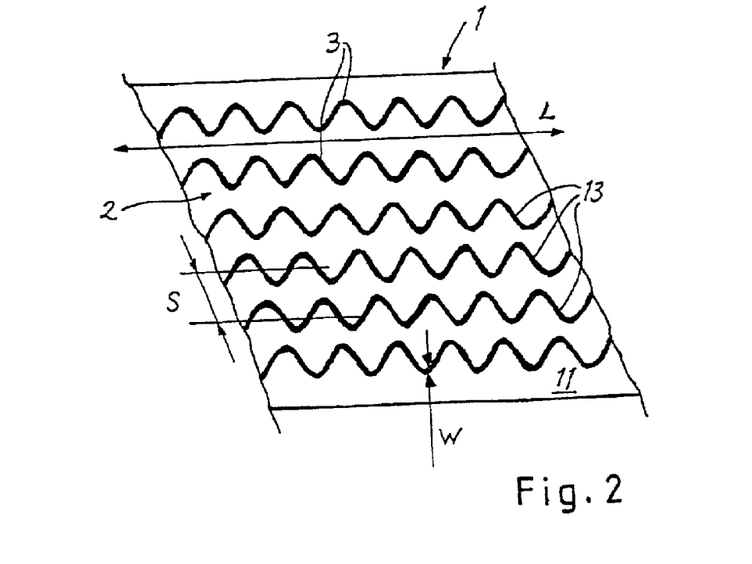
Figure 3:
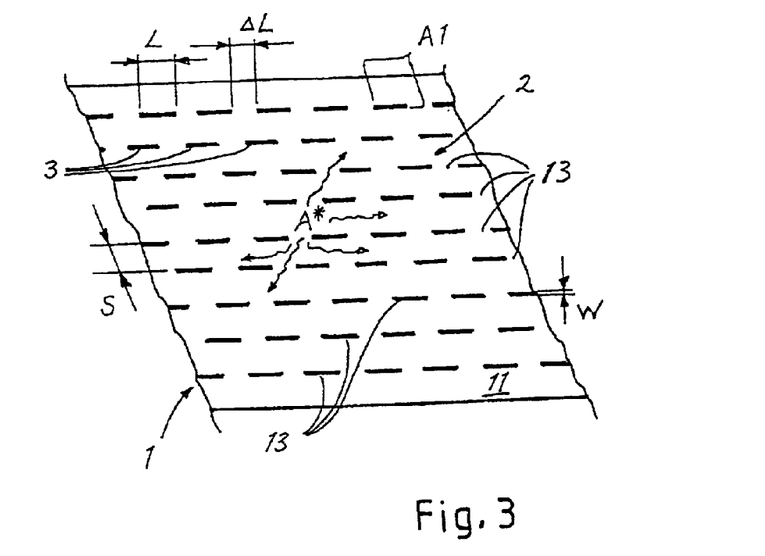
Figure 4:
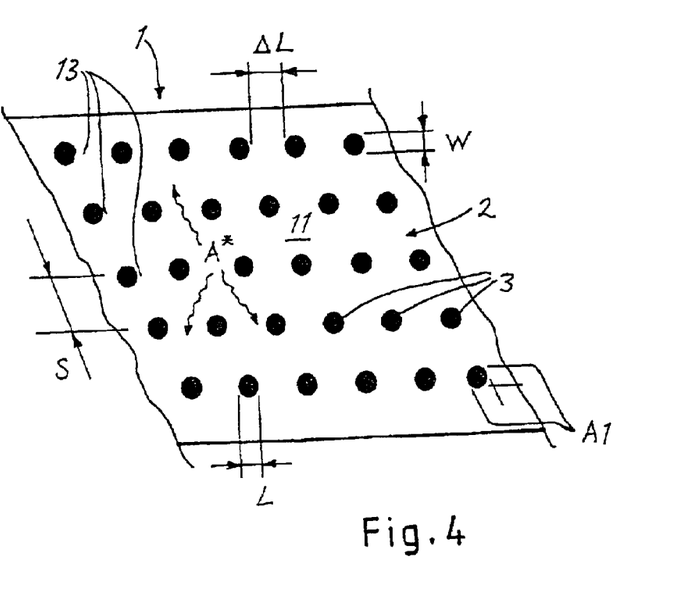
Figures 9, 10:
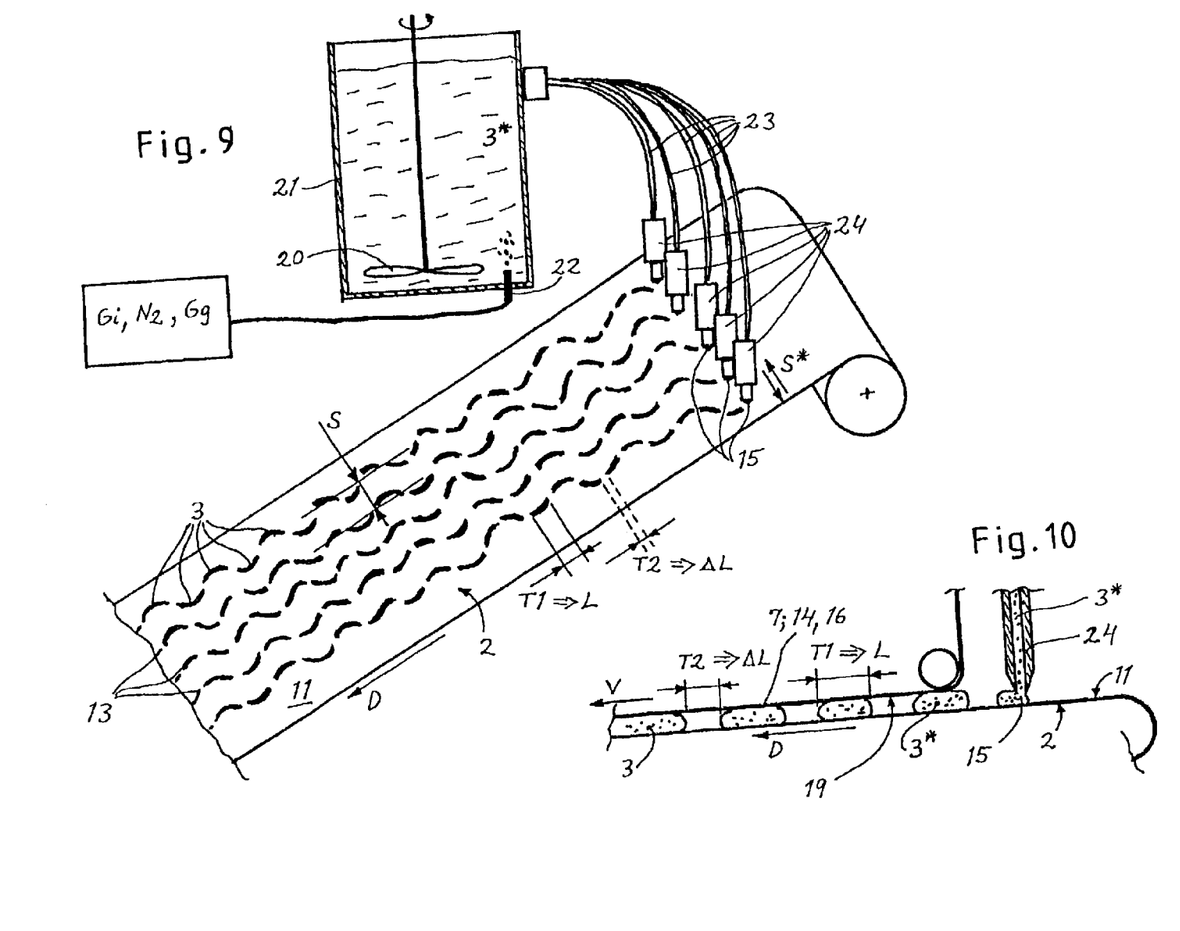
FIG. 9 represents schematically an apparatus and procedure according to the invention for the manufacture of an underlay according to the invention in which the strips forming the dampening projections are on one side of the sheet material.
FIG. 10 represents a modification of the apparatus and procedure of FIG. 9 for the manufacture of an underlay according to the invention in which the strips forming the dampening projections are between two layers of sheet material.

If extrusion points 15 of the invention, i.e. nozzles 24, are moved in a direction S* perpendicular to the direction of motion D of the first sheet material, then undulating strips 13, apparent from FIGS. 2 and 9, are produced, and if nozzles 24 are kept stationary then straight strips 13, apparent from FIGS. 1 and 3–4, are produced. If the extrusion is allowed to be continuous, then unbroken or continuous strips 13, apparent from FIGS. 1 and 2, are produced, but if the flow of molten polymer through nozzles 24 is interrupted, for example by a suitable valve not shown in the figures, at pre-determined time intervals $T_1$ for a certain periods of time $T_2$, then intermittently continuous strips 13, apparent from FIGS. 3–4 and 9, are obtained. The pre-determined time intervals $T_1$ produce stretches of length L in the strips of foamed and elastic polymer. The length L of the stretches may be for example in the range 2–60 mm to maximize the ventilation effect and escape of moisture achieved by the air gap between load-bearing floor 8 and surface material 9, i.e. the thickness H, because then moisture can escape in at least two directions to the edges of the floor both along the spaces between the strips formed by the intervals S and along the spaces formed by the gaps lengths ΔL between the strip stretches. The length L of the strip stretches can also be greater and in the extreme case, as previously described, unbroken. The periods of time $T_2$ during which there is no extrusion form the gap lengths ΔL between the stretches of strips 13. Control of time intervals $T_1$ and time periods $T_2$ can be implemented by a computer or other control electronics or even by other electrical or mechanical control devices.

In the method a second sheet material 7 can additionally be fed parallel to the direction of motion D of first sheet material 2 and at substantially the same velocity V as said first sheet material and at a spacing thickness H distant from first sheet material 2 at the same time as foamed or foaming polymer 3* is still in a molten state, as is shown in FIG. 10. In this case said foamed or foaming polymer in a molten state bonds fast also to the third surface 19 of second sheet material 7 and the strips 13 forming dampening projections 3 are between two sheet materials. As previously explained, the dampening projections 3 are then, as an effect of their material properties at the time of manufacture, i.e. the molten state of the foamed/foaming polymer 3*, bonded also to the second sheet material. The second sheet material 7, which in installed parquet floor or equivalent is located next to the upper surface 18 of load-bearing floor 8, should be moisture permeable such as paper or cardboard 14 or a perforated or porous plastics membrane 16.

As previously mentioned, according to the invention in underlay material 1 glue is not used on the first surface 11 of first sheet material 2 or on the third surface 19 of a possible second sheet material 7. Additionally, it is characteristic of the underlay material 1 according to the invention that after setting of the foamed/foaming polymer 3* the dampening projections 3 are not at least substantially tacky and so do not in any way adhere to other materials. So the foamed polymer or polymer mixture 3* for the dampening projections is sticky or has melt adhering properties when substantially in molten state, whereupon it bonds readily to the first sheet material 2, and to the second sheet material 7 respectively if applied, which conditions exist during the manufacturing only, and is non-sticky and has non-adhering properties in temperatures below its melting point or melting range, i.e. when the product is used. Since additionally the second surface 12 of the first sheet material and likewise the fourth surface 28 of a possible second sheet material are not tacky, i.e. are for example glueless or a possible surface coating has set or polymerized so as to be non-tacky, the underlay material 1 according to the invention independent of the form of implementation can be wound after manufacture into rolls without protective papers or protective films etc. between the layers of the roll for storage and transport to the site of use.

What is claimed is:

1. A prefabricated underlay material for location between an upper surface of a load-bearing floor and a parquet or other continuous surface material, which underlay material comprises:

a substantially flexible first sheet material having a first surf ace with a surface area;

dampening projections formed of porous resilient material on at least said first surface of the first sheet material, distributed along said first surface and having a total projection area less than said area of the first sheet material, wherein:

said first surface extends continuously and flat beneath the dampening projections and in the area between them; and said dampening projections formed of porous resilient material:

are made of a foamed polymer or polymer mixture bonded to said flat first surface by effect of its/their material properties at the time for manufacture; and are principally straight continuous or intermittently continuous strips located with intervals, or substantially undulating continuous or intermittently continuous strips located with intervals;

the underlay material further comprising a substantially flexible second sheet material having a third surface to which said porous polymer(s) forming the dampening projections is also bonded by effect of its/their material properties at the time of manufacture, and which second sheet material is located on the opposite side of the dampening projections relative to the first sheet material.

2. An underlay material of claim 1, wherein said second sheet material is a moisture-permeable material.

3. An underlay material of claim 1, wherein said third surface of second sheet material is glueless.

4. A prefabricated underlay material for location between an upper surface of a load-bearing floor and a parquet or other continuous surf ace material, which underlay material comprises:

a substantially flexible first sheet material having a first surface with a surface area;

dampening projections formed of porous resilient material on at least said first surface of the first sheet material, distributed along said first surface and having a total projection area less than said area of the first sheet material, wherein:

said first surface extends continuously and flat beneath the dampening projections and in the area between them; and said dampening projections formed of porous resilient material:

are made of a foamed polymer or polymer mixture bonded to said flat first surface by effect of its/their material properties at the time for manufacture; and are principally straight continuous or intermittently continuous strips located with intervals, or substantially undulating continuous or intermittently continuous strips located with intervals, wherein said first surface of the first sheet material is glueless.

5. A prefabricated underlay material for location between an upper surface of a load-bearing floor and a parquet or other continuous surface material, which underlay material comprises:

a substantially flexible first sheet material having a first surface with a surface area;

dampening projections formed of porous resilient material on at least said first surface of the first sheet material, distributed along said first surface and having a total projection area less than said area of the first sheet material, wherein:

said first surface extends continuously and flat beneath the dampening projections and in the area between them; and said dampening projections formed of porous resilient material:

are made of a foamed polymer or polymer mixture bonded to said flat first surface by effect of its/their material properties at the time for manufacture; and are principally straight continuous or intermittently continuous strips located with intervals, or substantially undulating continuous or intermittently continuous strips located with intervals, wherein said dampening projections have sticky melt adhering properties when substantially in a molten state, and non-sticky, non-adhering properties in temperatures below its melting point or melting range.

6. An underlay material of claim 5, wherein the dampening projections have lengths of at least 2 mm in the direction of the strips.

7. An underlay material of claim 5, wherein the dampening projections have widths and the thicknesses, which are in the range 1 mm–10 mm.

8. An underlay material of claim 7, wherein the dampening projections have intervals therebetween, which are at least equal to said widths of the dampening projections.

9. An underlay material of claim 5, wherein the flexible first sheet material is one of a prefabricated impervious polymer membrane, whereupon it is a moisture barrier as such, a prefabricated paper or cardboard, and a prefabricated laminate which comprises a prefabricated impervious polymer membrane, forming a moisture barrier, and one or more layers of paper and/or cardboard and/or additional polymer membrane(s).

10. An underlay material of claim 9, wherein the first sheet material is a polymer membrane(s) that creates a moisture barrier and is selected from the group consisting of polyethylene, a polyolefin, a polyester, and polypropylene.

11. An underlay material of claim 9, wherein said first sheet material is a polymer membrane forming a moisture barrier that is located on that side of the laminate which faces towards the dampening projections.

12. An underlay material of claim 9, wherein the dampening projections are selected from the group consisting of polyethylene, atactic polypropylene, a polyolefin, polyether, ethyl vinyl acetate, polyamide, polyurethane, silicon rubber, a biopolymer, and a mixture of these.

13. An underlay material of claim 12, wherein the first sheet material is a polymer that has a melting point or melting range, which is higher than a melting point of the porous and resilient polymer(s) forming the dampening protections.

14. An underlay material of claim 12, wherein the dampening projections have a creep deformation of less than 10% under a load of 500 kPa applied for 24 hours.

15. An underlay material of claim 12, wherein the dampening projections have porosity between 40–80% by volume.

16. An underlay material of claim 5, wherein the dampening projections have total projection areas, which together are 5–40% of the total area of the sheet material so that the loading of the dampening material is in the elastic region.

17. A prefabricated underlay material for location between an upper surface of a load-bearing floor and a parquet or other continuous surface material, which underlay material comprises:

a substantially flexible first sheet material having a first surface with a surface area;

dampening projections formed of porous resilient material on at least said first surface of the first sheet material, distributed along said first surface and having a total projection area less than said area of the first sheet material, wherein:

said first surface extends continuously beneath the dampening projections; and said dampening projections formed of porous resilient material;

are a foamed polymer or polymer mixture bonded to said first surface without glue through preliminary melt adhering; and are continuous or intermittently continuous strips located with intervals.

18. An underlay material of claim 17, wherein the flexible first sheet material is:

a prefabricated impervious polymer membrane, or a prefabricated paper or cardboard, or a prefabricated laminate which comprises a prefabricated impervious polymer membrane and one or more layers of paper and/or cardboard and/or additional polymer membrane(s).

19. An underlay material of claim 17, wherein the dampening projections are selected from the group consisting of substantially polyethylene, atactic polypropylene, a polyolefin, polyether, ethyl vinyl acetate, polyamide, polyurethane, silicon rubber, a biopolymer and a mixture of these.

20. An underlay material of claim 19, wherein the dampening projections have a modulus of elasticity in its unfoamed state between 0.002–4 GPa.

21. An underlay material of claim 19, wherein the dampening projections further comprises additive(s) waxes, oils, terpene resins, derivatives of natural resins, phenyl resins, coumarone resins or some combination of these.

22. An underlay material of claim 17, wherein the first sheet material is a polymer that forms an impervious polymer membrane, that acts as a moisture barrier, and that has a melting point or melting range that is higher than a melting point of the porous and resilient polymer(s) forming the dampening projections.

23. An underlay material of claim 17, wherein the dampening projections have a creep formation of less than 10% under a load of 500 kPa applied for 24 hours.

24. An underlay material of claim 17, wherein the dampening projections have a porosity between 40–80% by volume.

25. An underlay material of claim 17, wherein the dampening projections have total projection areas, which together are 5–40% of the total area of the sheet material so that the loading of the dampening material is in the elastic region.

26. An underlay material of claim 17, further comprising a substantially flexible second sheet material having a third surface to which said porous polymer(s) forming the dampening projections is also bonded by effect of its/their material properties at the time of manufacture, and which second sheet material is located on the opposite side of the dampening projections relative to the first sheet material.

* * * * *